Figure 1:
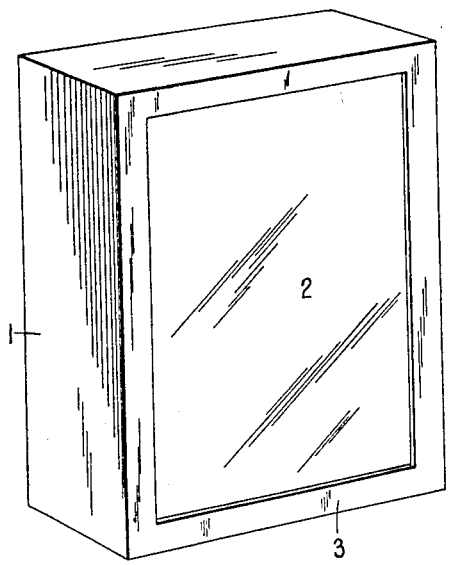

P. T. TIBBLES.
METHOD OF AND MEANS FOR PRODUCING AN OPTICAL ILLUSION.
APPLICATION FILED OCT. 27, 1920.

1,387,631.

Patented Aug. 16, 1921.
2 SHEETS—SHEET 1.

Percy Thomas Tibbles,
INVENTOR, by
Bakewell, Byrnes & Parmelee,
Attorneys.

UNITED STATES PATENT OFFICE.

PERCY THOMAS TIBBLES, OF LONDON, ENGLAND.

METHOD OF AND MEANS FOR PRODUCING AN OPTICAL ILLUSION.

1,387,631.    Specification of Letters Patent.    Patented Aug. 16, 1921.

Application filed October 27, 1920. Serial No. 419,930.

*To all whom it may concern:*

Be it known that I, PERCY THOMAS TIBBLES, a subject of the King of England, residing at 54 High street, Bloomsbury, London, W. C., England, have invented certain new and useful Improvements in Methods of and Means for Producing Optical Illusions, of which the following is a specification.

The present invention relates to a new method of and means for producing an optical illusion consisting in changing an illuminated picture, design, or like effect in such a manner that the means by which the change is produced are and remain invisible to a spectator placed in front of the picture. The change preferably relates to both the design or composition and the colors of the picture, and may be effected gradually whereby very artistic and original effects are produced. The picture to be changed is executed in such a manner as to be semi-transparent or translucent and become more visible to the eye of the spectator when illuminated from behind. Between the picture and the source of light, which may be placed behind the picture and at a comparatively small distance from it, are movably arranged one or more translucent or semi-transparent pictures which will hereafter be called "masks." These masks are, if sufficiently removed from the front picture, hereinafter called "picture," and from one another, invisible to the spectator who is located in front of the picture, although they remain between the picture and the source of light and are illuminated by the latter. They become visible to the spectator when they are brought close to the picture. This phenomenon is rather surprising, particularly in view of the fact that the picture is illuminated from behind by light passing through the masks, and the phenomenon occurs even if a strong and rather concentrated source of light, for instance an electric filament lamp of high power is used at a rather short distance and centrally behind the picture and the masks. When the first mask is moved toward the picture it becomes gradually visible, not as a separate effect but as an additional effect superimposed upon the picture, that is to say the spectator can see only the composite effect of the picture and the first mask both as regards the drawing or design and the colors, and he will therefore have the impression that the picture has gradually changed in design and color.

A similar effect is produced by bringing the second mask close up to the first mask, and so on. The reverse change is produced by moving gradually the masks away from the picture, starting with the last mask. It may be pointed out that a very small movement is sufficient to make a mask effective or ineffective and it is therefore necessary when a mask is being removed, that is moved away from the preceding mask, to hold the other masks close to one another and the picture.

If the invention is used for advertising purposes the changing of the picture may be continuous, that is the masks may be advanced toward the picture, then moved away in the reverse order, advanced again and so on, and the movement of the masks may be produced by a motor or a clockwork mechanism or in any other suitable manner. If it is not desired to change the picture in both senses, that is by first superimposing the effects of the masks and then removing the superimposed effects one by one, all the masks may be moved away from the picture simultaneously and if desired the light may be extinguished or covered during this time. Or the opposite effect only may be produced by exhibiting first the picture with the masks in their operative positions, that is brought up quite close to and preferably in contact with the picture and one another, and then gradually removing the masks starting with the last or back mask. In this case the light may be covered or turned off during the reverse operation, that is while the masks are brought back into operative position.

The invention may be used for educational purposes, for instance for demonstrating the growth of a plant. It may also be used for changing stage scenery, amusement, signaling and various other purposes.

It should be pointed out that while a certain degree of transparency is essential for the purposes of the invention, both in the picture and the masks, the actual degree of transparency and the manner in which it is obtained must necessarily depend on the requirements of each particular case, the number of the masks used, the nature of the colors, the nature of the picture, the light and other factors.

As a rule the picture should be executed on a semi-transparent material such as paper, linen, silk, union, ground glass. Such materials as clear glass, gelatin, celluloid are rather too transparent and unsuitable but may if desired be used for the mask. That part of the picture which it is desired to alter, if painted on the picture, should be done in soft light tints. Hard lines and big patches of vivid colors should as a rule be avoided in the "working" parts of the picture. The first mask may be painted or drawn in darker colors and more definite lines than the picture. The second mask may be still darker or more definite than the first, and so on. The greater the transparency of the masks, the larger the number that may be employed. It is necessary to use transparent colors for the picture, and also the masks, although to a lesser degree, and a rather convenient way of putting on the colors is by means of an aerograph. It is possible to use an opaque or pigment color for some portions of a mask provided that such portions are so situated that as the mask moves away from the picture and nearer to the light, sufficient light can filter through the unpainted or semi-transparently painted parts of the mask to obliterate the effects of the opaquely painted part. It might also in some cases be preferred to have opaque portions on the picture, for instance if the picture is made of several sections, in order to cover up the joints, or if the mask is made of several sections. Particularly in applying the invention to stage-scenery, it may be necessary to make up the device in sections, joining two or more sections together and operating the masks separately or together.

It is important that the masks should all fit tightly against the back of the picture at the same time, to give clear definition to the whole or composite effect when illuminated. The changing effect starts immediately any one mask is separated from another mask or from the picture by the merest fraction of an inch. While the back mask is being moved the other masks must be held rigidly against the picture, until it is the turn of the next mask to move, and so on. The distance a mask must be withdrawn to obliterate completely its effect upon the picture usually varies from one to four inches, but this largely depends upon the visibility of the color used. A patch of vivid green, for example, requires a greater disappearing distance than a similar patch of pink. The colors that disappear easiest should be reserved for the mask or masks nearest the picture. In addition to changing the design of a picture it is possible to change the colors, or the colors alone may be changed. For instance the change may consist in showing a woman dressed in a white gown that changes its shade through the whole range of tints to a black. It may be pointed out that the colors in the different masks and the picture are combined by the light behind in much the same way as an artist will mix primary colors to produce other shades. As one color separates from or joins the others by the movement of a mask, so the prevailing tint of the combination changes. By this means, two or three masks will produce the effect of a larger number of color changes. Printed words can be added to or changed in the same way as any other design.

As regards the relative movement of the masks toward and from the picture, it may of course be of any suitable kind, for instance the mask may be moved parallel to the picture in a direction at right angles thereto, or they may be hinged to the picture and swung into or away from the effective positions. That part of the rear mask which is nearest the hinge comes into view first when the masks approach and is the last to disappear when the masks separate. A gradual change in a certain direction may in many cases be preferable to a simultaneous change of the whole surface of the picture, as it may be more easily followed by the eye. By bringing successive masks alternately at the top and the bottom the direction of the change may be varied. By this means it is for instance possible to show the picture of a dressed woman changing first her boots, then her gloves and lastly her hat. If the movement of the masks were parallel, the changes would occur simultaneously.

The accompanying drawings show by way of example one construction of an apparatus suitable for carrying out the invention.

Figure 2:
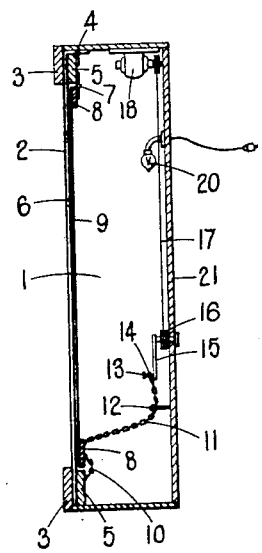
Figure 3:
Figure 4:
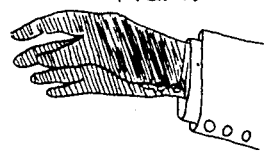
Figure 5:
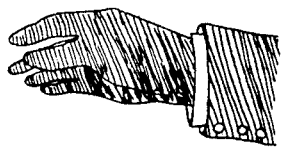
Figure 6:
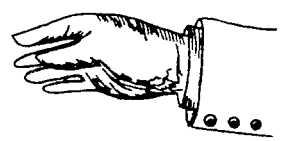
Figure 7:
Figure 8:
Figure 9:
Figure 10:
Figure 11:

Figure 1 is a front elevation, Fig. 2 a vertical cross section of the apparatus, Fig. 3 shows a picture, Fig. 4 the first mask, Fig. 5 the second mask, Fig. 6 the third mask and Fig. 7 the composite effect of the picture and the three masks, Figs. 8 to 11 show four successive effects in a case where the performance starts with the fully developed picture, that is the picture and the three masks brought together, and the change consists in obliterating. Fig. 8 represents the composite effect, Fig. 9 the effect after the last mask has been moved away, Fig. 10 the effect after two masks have been removed, and Fig. 11 the picture.

In Figs. 1 and 2, 1 represents a frame or casing in which the picture 2 is mounted upon the rear surface of a molding 3. To the molding 3 is hinged at 4 a frame 5 upon the front surface of which is mounted the first mask 6. To the frame 5 is hinged at 7 a frame 8 upon which is mounted the second mask 9 as shown. Spiral springs (not shown) may be provided on the hinges to hold the masks 6 and 9 against the picture 2, or other means may be provided for this purpose, for instance weights. The masks 6 and 9 are connected at the bottom edge by a short piece of chain 10. The mask 9 is connected by a cord or chain 11 passing through an eye 12, to a crank pin 13, the cord being attached to the pin by means of an eye 14. The crank 15 is continuously rotated by means of a pulley 16 and a rope 17 from an electric motor 18 mounted inside the casing, but a clock work or other motor may of course be employed. It will be seen that half a revolution of the crank will first pull the mask 9 away from mask 6 and then through chain 10 the mask 6 from the picture, and that during the next half revolution first mask 6 and then mask 9 will be brought close to the picture by the springs. The source of light is indicated by 20. The back wall 21 may be covered with polished tin to reflect and diffuse the light.

This apparatus may also be used in painting the masks. The picture may be first painted on the outer surface of the material mounted on the molding 3; the rear mask carrier may then be lifted up and the mask 6 may be painted from the inside while in contact with the picture, and the mask 9 may be finally painted from the inside. In this manner perfect registration of the masks and the picture may be obtained.

It may be pointed out that this invention is restricted to a method and apparatus in which the picture is illuminated from behind by a source of light.

I claim:—

1. A method of producing an optical illusion by changing the picture design or like effect characterized by the fact that semi-transparent mask or masks are gradually moved toward and away from the picture and between the picture and a source of light, substantially as described.

2. A method for producing an optical illusion according to claim 1 further characterized by the fact that the masks are gradually moved angularly toward or away from the picture, and between the picture and a source of light substantially as described.

3. An apparatus for producing an optical illusion consisting in changing an illuminated picture, design or like effect, comprising a semi-transparent picture, one or more semi-transparent masks adapted to be gradually moved into close contact with the picture and one another and away from the picture and one another, and a source of light arranged behind the mask or masks from the picture, substantially as described.

4. An apparatus for producing an optical illusion consisting in changing an illuminated picture, design or like effect, comprising a semi-transparent picture, one or more semi-transparent masks adapted to be gradually moved into close contact with the picture and one another and away from the picture and one another, and a source of strong artificial light between which and the picture the mask or masks are so moved, substantially as described.

In testimony whereof I have hereunto set my hand in the presence of two witnesses.

PERCY THOMAS TIBBLES.

Witnesses:
E. CHALDECOTT,
I. Mc. GIBBON.